(12) United States Patent
Blank et al.

(10) Patent No.: US 9,524,713 B2
(45) Date of Patent: Dec. 20, 2016

(54) BUSINESS PLATFORM VOICE INTERACTIONS

(75) Inventors: Guy Blank, Tel Aviv (IL); Guy Soffer, Ra'anana (IL)

(73) Assignee: SAP SE, Walldorf (DE)

( * ) Notice: Subject to any disclaimer, the term of this patent is extended or adjusted under 35 U.S.C. 154(b) by 739 days.

(21) Appl. No.: 13/483,544

(22) Filed: May 30, 2012

(65) Prior Publication Data

US 2013/0325461 A1 Dec. 5, 2013

(51) Int. Cl.
| | | |
|---|---|---|
| *G10L 21/00* | (2013.01) | |
| *G10L 15/26* | (2006.01) | |
| *G06F 21/00* | (2013.01) | |
| *G06F 17/00* | (2006.01) | |
| *H04Q 7/20* | (2006.01) | |
| *G10L 13/04* | (2013.01) | |

(52) U.S. Cl.
CPC ............... *G10L 13/04* (2013.01); *G10L 15/26* (2013.01)

(58) Field of Classification Search
CPC ......... G10L 15/26; G10L 21/00; G06Q 30/00; G06F 21/00; G06F 17/00; H04Q 7/20
USPC .... 704/235, 270, 275; 705/26.1; 707/3, 770; 715/234
See application file for complete search history.

(56) References Cited

U.S. PATENT DOCUMENTS

| | | | | | |
|---|---|---|---|---|---|
| 6,658,389 | B1 * | 12/2003 | Alpdemir | ............... | G06Q 30/02 704/270 |
| 6,744,877 | B1 * | 6/2004 | Edwards | ................. | H04M 3/51 379/142.04 |
| 7,721,193 | B2 * | 5/2010 | Upton | ..................... | G06F 9/541 715/234 |
| 8,000,969 | B2 * | 8/2011 | Da Palma | ............... | G10L 15/22 704/270 |
| 8,032,383 | B1 * | 10/2011 | Bhardwaj | ............... | G10L 15/30 455/420 |
| 8,060,412 | B2 * | 11/2011 | Rosenbaum | ........... | G06Q 30/02 704/244 |
| 8,140,680 | B2 * | 3/2012 | Behrendt | .......... | G06F 17/30734 709/223 |
| 8,661,459 | B2 * | 2/2014 | Gandhi | ............... | G06F 17/3089 715/234 |
| 2001/0047270 | A1 * | 11/2001 | Gusick | ................. | G06Q 30/016 705/1.1 |
| 2003/0069727 | A1 * | 4/2003 | Krasny | ................... | G10L 15/20 704/228 |
| 2003/0126236 | A1 * | 7/2003 | Marl | ................. | H04L 29/08846 709/220 |
| 2004/0133426 | A1 * | 7/2004 | Kimura | ............... | B60R 16/0373 704/272 |
| 2005/0038876 | A1 * | 2/2005 | Chaudhuri | .......... | G06F 17/3087 709/219 |
| 2005/0179540 | A1 * | 8/2005 | Rubenstein | ......... | B60R 16/0373 340/539.18 |

(Continued)

*Primary Examiner* — Pierre-Louis Desir
*Assistant Examiner* — Seong Ah A Shin
(74) *Attorney, Agent, or Firm* — Buckley, Maschoff & Talwalkar LLC

(57) ABSTRACT

According to some embodiments, a user device may receive business enterprise information from a remote enterprise server. The user device may then automatically convert at least some of the business enterprise information into speech output provided to a user of the user device. Speech input from the user may be received via and converted by the user device. The user device may then interact with the remote enterprise server in accordance with the converted speech input and the business enterprise information.

20 Claims, 13 Drawing Sheets

(56) References Cited

U.S. PATENT DOCUMENTS

| | | | | |
|---|---|---|---|---|
| 2005/0289130 | A1* | 12/2005 | Cohen | G06F 17/30905 |
| 2006/0156278 | A1* | 7/2006 | Reager | G06F 8/70 717/104 |
| 2007/0149212 | A1* | 6/2007 | Gupta | H04L 67/18 455/456.1 |
| 2008/0086564 | A1* | 4/2008 | Putman | H04L 29/06 709/227 |
| 2013/0090932 | A1* | 4/2013 | Miyazaki | G10L 21/028 704/275 |
| 2013/0254849 | A1* | 9/2013 | Alison | G06F 21/51 726/4 |

* cited by examiner

| ENTERPRISE INFORMATION IDENTIFIER 1102 | ENTERPRISE INFORMATION 1104 | USER VOICE INPUT 1106 | CONVERTED TEXT 1108 | RESULT 1110 |
|---|---|---|---|---|
| E_12345 | NEW SALES ORDER RECEIVED | | | DISPLAY TO USER |
| E_12346 | ASK USER TO APPROVE SALES ORDER | AUDIO1.MP3 | APPROVED | SALES ORDER FORWARDED FOR PROCESSING |
| E_12347 | ASK USER TO APPROVE SALES ORDER | AUDIO2.MP3 | NO | SALES ORDER RETURNED |
| E_12348 | ALERT FROM CUSTOMER DISPLAYED TO USER | AUDIO3.MP3 | DELETE ALERT | REQUESTED ENTERPRISE SERVER TO DELETE ALERT |

FIG. 11

BUSINESS PLATFORM VOICE INTERACTIONS

FIELD

Some embodiments relate to systems and methods associated with interactions between a user and a business platform. More specifically, some embodiments are directed to systems and methods to facilitate voice interactions between a user and a business platform.

BACKGROUND

Users may interact and/or exchange information with a business enterprise application. For example, a user might access a remote business enterprise server via his or her smartphone to review and approve a purchase request. Typically, a keyboard or touch screen is used to interact with a business server. For example, the user might touch an "Accept" icon to approve a pending purchase order.

Under certain circumstances, these types of interactions with a business enterprise application may be impractical and error prone. For example, when a user is focused on other tasks (e.g., reading a financial report or driving an automobile), it might be difficult for him or her to receive and/or provide business enterprise information via a keyboard or touch screen.

Accordingly, methods and mechanisms to efficiently, accurately, and/or automatically facilitate interactions between a user and a business platform may be provided in accordance with some embodiments described herein.

SUMMARY

Some embodiments provide a system, method, program code and/or means to facilitate voice interactions between a user and a business server. According to some embodiments, a user device may receive business enterprise information from a remote enterprise server. The user device may then automatically convert at least some of the business enterprise information into speech output provided to a user of the user device. Speech input from the user may be received via and converted by the user device. The user device may then interact with the remote enterprise server in accordance with the converted speech input and the business enterprise information.

With these and other advantages and features that will become hereinafter apparent, further information may be obtained by reference to the following detailed description and appended claims, and to the figures attached hereto.

BRIEF DESCRIPTION OF THE DRAWINGS

FIG. 11 illustrates a portion of a business enterprise information database that might be stored in accordance with some embodiments.

DETAILED DESCRIPTION

Users may interact and/or exchange information with a business enterprise application. For example, a user might access a remote business enterprise server via his or her smartphone to review and approve a purchase request. Typically, a keyboard or touch screen is used to interact with a business server. For example, the user might touch an "Accept" icon to approve a pending purchase order.

Figure 1:
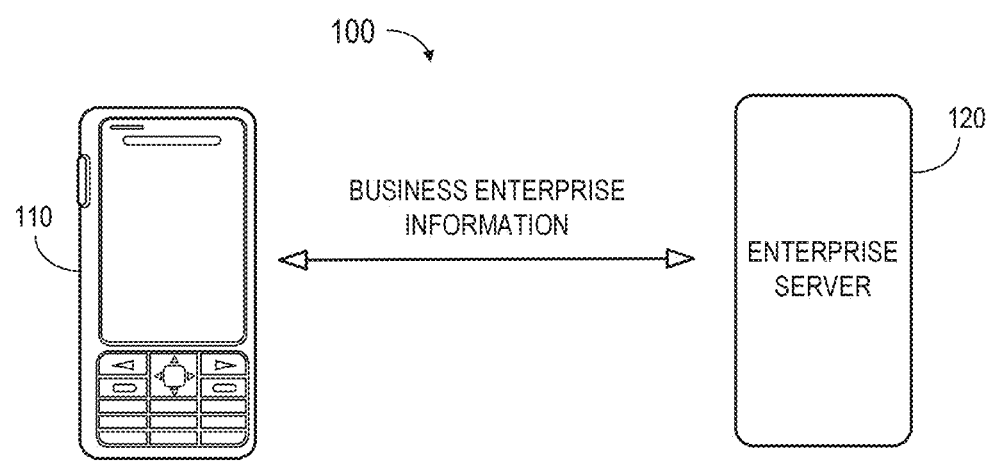
FIG. 1 is a block diagram of a system architecture according to some embodiments.

Under certain circumstances, these types of interactions with a business enterprise application may be impractical and error prone. For example, when a user is focused on other tasks (e.g., reading a financial report or driving an automobile), it might be difficult for him or her to receive and/or provide business enterprise information via a keyboard or touch screen. To address such problems, FIG. 1 is a block diagram of a system 100 according to some embodiments. The system 100 includes a mobile user device 110 that can exchange business enterprise information, such as purchase requests or other operations associated with a business work flow. The mobile user device 110 might be associated with, by ways of example only, a mobile computer, a smartphone, a gaming device, a navigation device, a music player, or glasses having a lens based display.

The mobile user device 110 may exchange business enterprise information with an enterprise server 120. By way of example only, the enterprise server 120 might be associated with an Enterprise Resource Planning (ERP) server, a business services gateway, a HyperText Transfer Protocol (HTTP) server, and/or an Advanced Business Application Programming (ABAP) server.

According to some embodiments, the enterprise server 120 may directly communicate with one or more remote mobile user devices 110 via the Internet. According to other embodiments, a gateway may be provided between the enterprise server 120 and the mobile user devices 110. The mobile user devices 110 may include one or more processors to receive electronic files and/or to execute applications and/or components (e.g., a plug-in that is integrated to a smartphone).

Note that FIG. 1 represents a logical architecture for the system 100 according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the enterprise server 120 and mobile user device 110, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
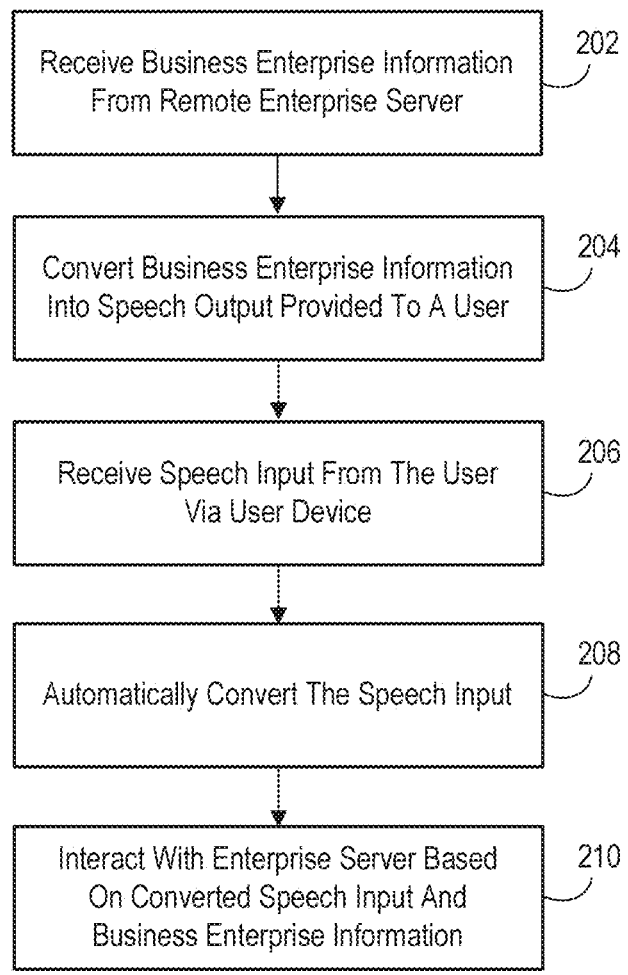
FIG. 2 is a flow diagram of a process in accordance with some embodiments.

According to some embodiments, the mobile user device 110 may facilitate voice interactions between a user and the enterprise server 120. For example, FIG. 2 is a flow diagram of a process 200 that might be associated with the illustration of the system 100 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At 202, a user device may receive business enterprise information from a remote enterprise server. The user device might comprise, for example, a mobile computer, a smartphone, a gaming device, a navigation device, a music player, or a pair of glasses with a lens mounted display. According to other embodiments, the user device may instead comprise a personal computer or a kiosk. The remote enterprise server might be associated with, for example, an Enterprise Resource Planning ("ERP") application, a Customer Relationship Management ("CRM") application, and/or an Advanced Business Application Programming ("ABAP") application.

At 204, the user device may automatically convert at least some of the business enterprise information into speech output provided to a user of the user device. For example, the user device might read an email message to the user. According to some embodiments, the conversion of the business enterprise information into the speech output is facilitated by an interaction engine, executing at the user device, via a text-to-speech connector communicating with a third party text-to-speech engine.

At 206, speech input may be received from the user via the user device. The speech input may then be automatically converted at 208. For example, the user device might listen to the user's words via a microphone and convert those sounds to text or any other machine-readable code. According to some embodiments, this conversion of speech input is facilitated by an interaction engine, executing at the user device, via a speech-to-text connector communicating with a third party speech-to-text engine. Moreover, the conversion may be performed in accordance with model eXtensible Markup Language ("XML") information and/or an Application Programming Interface ("API").

At 210, an interaction with the remote enterprise server may occur in accordance with the converted speech input and the business enterprise information. The interaction may be associated with, for example, a purchase request, a purchase order, a sales order, contact information, a workflow, or a business an alert.

Figure 3:
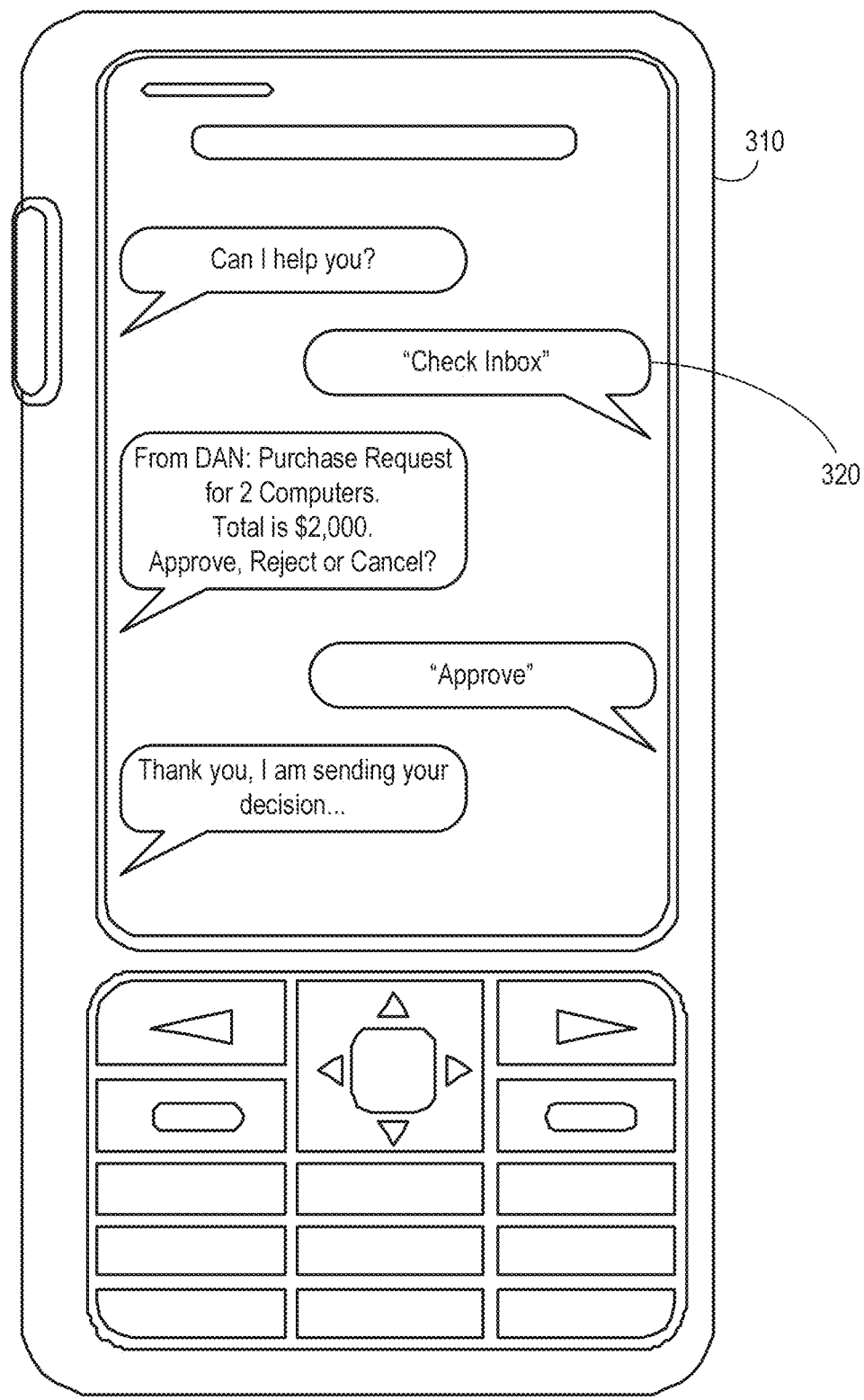
FIG. 3 is an example of a mobile user device displaying information according to some embodiments.

Consider, for example, FIG. 3 which includes a mobile user device 310 displaying information according to some embodiments. Initially, the user device 310 may receive business enterprise information from a remote enterprise server. For example, when the user verbally instructs the user device 310 to "Check Inbox" (as illustrated by dialog balloon 320), the user device 310 might retrieve inbox information from the remote enterprise server. The user device 310 may then automatically convert at least some of the inbox into speech output that is read to the user (e.g., details about the purchase request as illustrated in FIG. 3). Speech input may be received from the user via the user device 310. In the example of FIG. 3, the user speaks the word "Approve" and that speech input may then be automatically converted to text by the user device 310. Finally, the user device 310 may interact with the remote enterprise server in accordance with the converted speech input and the business enterprise information (e.g., by transmitting an indication of approval for the purchase order).

Figure 4:
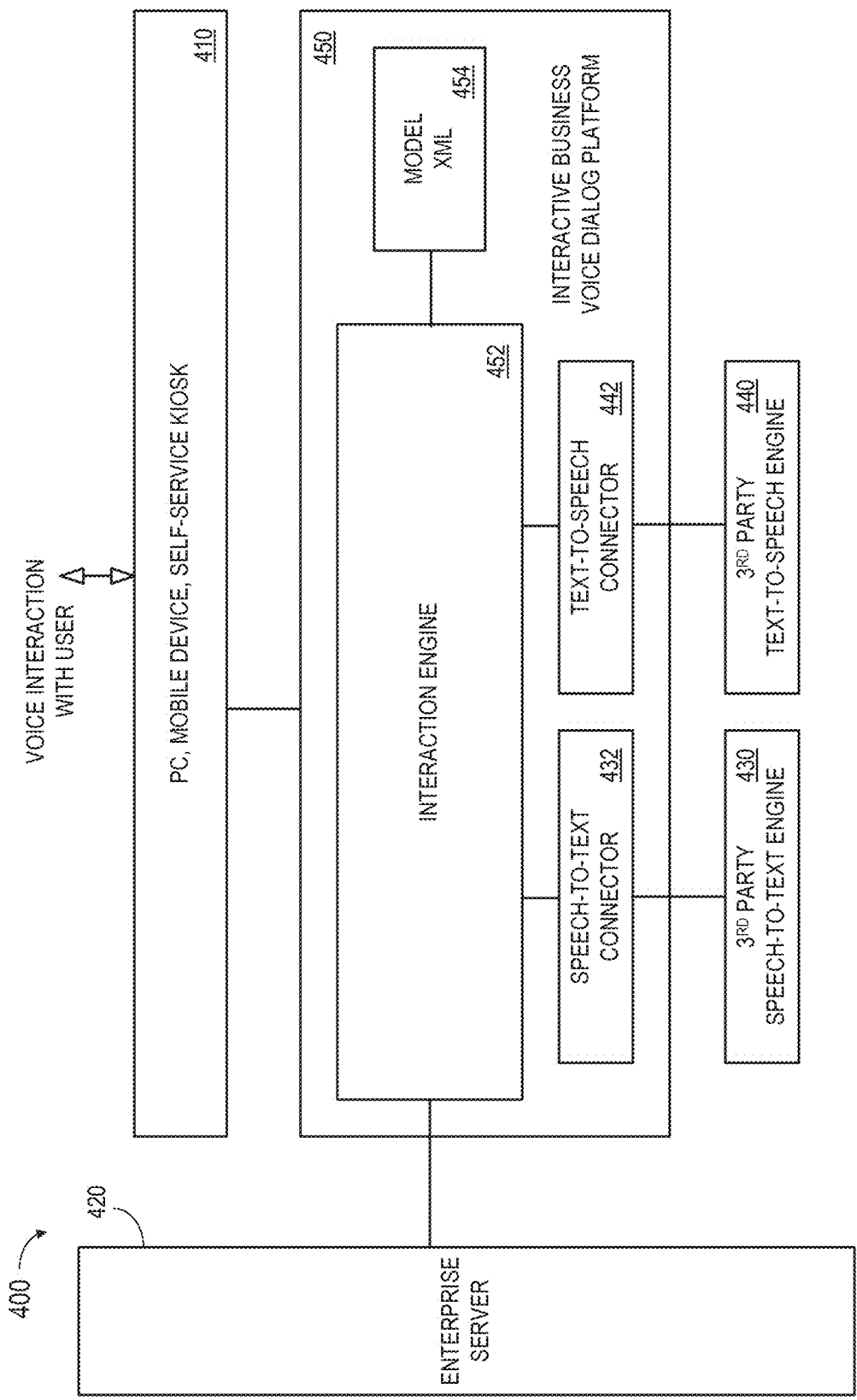
FIG. 4 is a block diagram of a system in accordance with some embodiments.

FIG. 4 is a block diagram of a system 400 in accordance with some embodiments. The system 400 includes a device 410, such as a PC, mobile device, or self-service kiosk, that facilitates voice interactions between a user and a remote enterprise server 420. In particular, an interactive business voice dialog platform 450 may communicate with both the user device 410 and the enterprise server 420. The interactive business voice dialog platform 450 includes an interaction engine 452 that executes a model XML 454 to operate in accordance with any of the embodiments described herein. The interaction engine 452 may also communicate with a third party speech-to-text engine 430 via a speech-to-text connector 432 and with a third party text-to-speech engine 440 via a text-to-speech connector 442. In this way, a designer may generate simple XML code to provide voice control of enterprise server 420 functions (letting $3^{rd}$ parties handle the complex speech/text conversion tasks).

Figure 5:
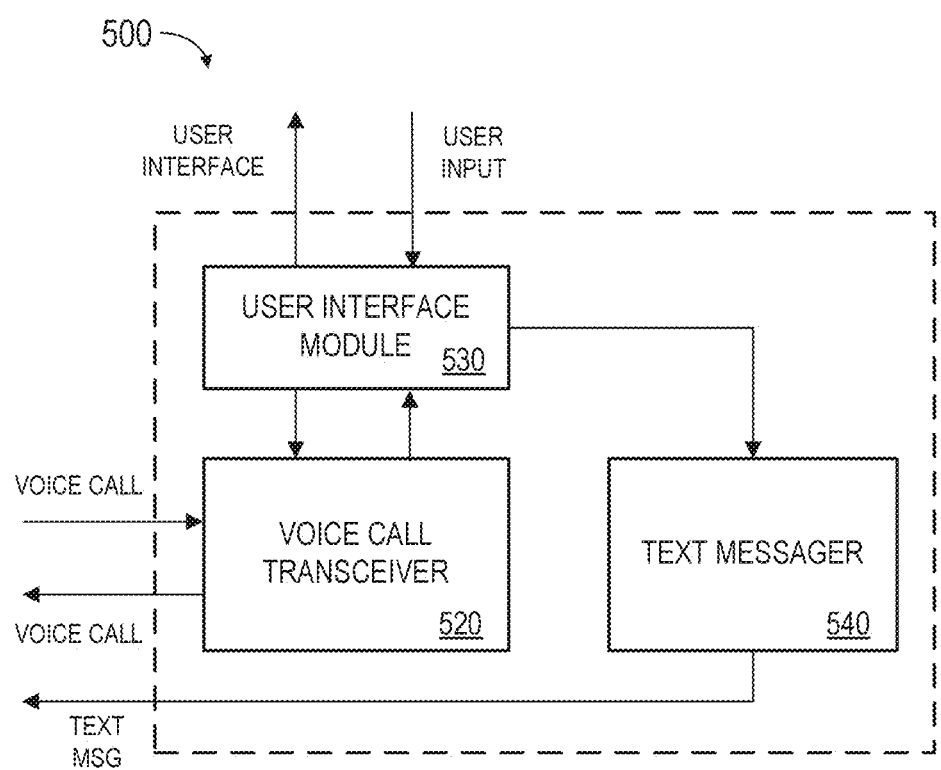
FIG. 5 is block diagram of a mobile communication device according to some embodiments.

Some embodiments of the present invention may be implemented via smartphones. For example, FIG. 5 is a block diagram of smartphone device 500 according to some embodiments. Device 500 may handle communication events (including voice calls and email messages) and facilitate voice interactions between a user and an enterprise application. Device 500 may include functionality associated with different types of portable devices, including Personal Digital Assistants (PDAs), digital media players, digital cameras, wireless email devices, and any other device for receiving or transmitting various types of communications, such as voice calls, that is or becomes known.

Device 500 includes voice call transceiver 520, user interface module 530, and text messager 540. Each element of device 500 may comprise any combination of hardware and/or software components suitable for providing the functions attributed thereto herein. Two or more of transceiver 520, user interface module 530, and text messager 540 may share one or more constituent components, and, in some embodiments, device 500 may include unshown elements for providing the functions described herein.

Voice call transceiver 520 may receive and transmit voice calls via any suitable protocol. Voice call transceiver 520 may also receive caller information associated with received voice calls. The caller information may comprise caller ID information and/or any other information that device 500 may use to identify a party using the device and/or from whom a voice call is received (and such an identification may facilitate a speech to text conversion process).

A user input may be transmitted to voice call transceiver 520 by user interface module 530. In this regard, voice call transceiver 520 may notify module 530 of the reception of the voice call. User interface module 530 may present a user interface to a user in response to the notification. The user interface, examples of which are described below, may facilitate voice interactions between a user and an enterprise application via the device 500 and/or similar devices.

User interface module 530 may also instruct text messager 540 to transmit a text message. In response, text messager 540 transmits a text message using a suitable text messaging service. The text messaging service may comprise any currently- or hereafter-known text messaging service. Conventional examples include IM, SMS, Multimedia Message Service (MMS), Enhanced Message Service (EMS), and electronic mail.

Communication history about enterprise server interactions handled by the voice call transceiver 520 and/or text messages 540 may be stored at the device 500 and/or transmitted to a remote server. Moreover, such information may be provided to the user as appropriate via the user interface module 530. As a result, some embodiments of the FIG. 1 system 100, the FIG. 2 process, and/or the FIG. 5 device 500 may provide more efficient and enhanced communications between a user and a business application than previously available. Although the device 500 illustrated in FIG. 5 may be associated with a wireless telephone network, note that any of the embodiments described herein may be associated with other types of devices, including devices that exchange information (e.g., voice and data) via circuit switched or packet switched protocols (e.g., Internet Protocol (IP) packets).

Figure 6:
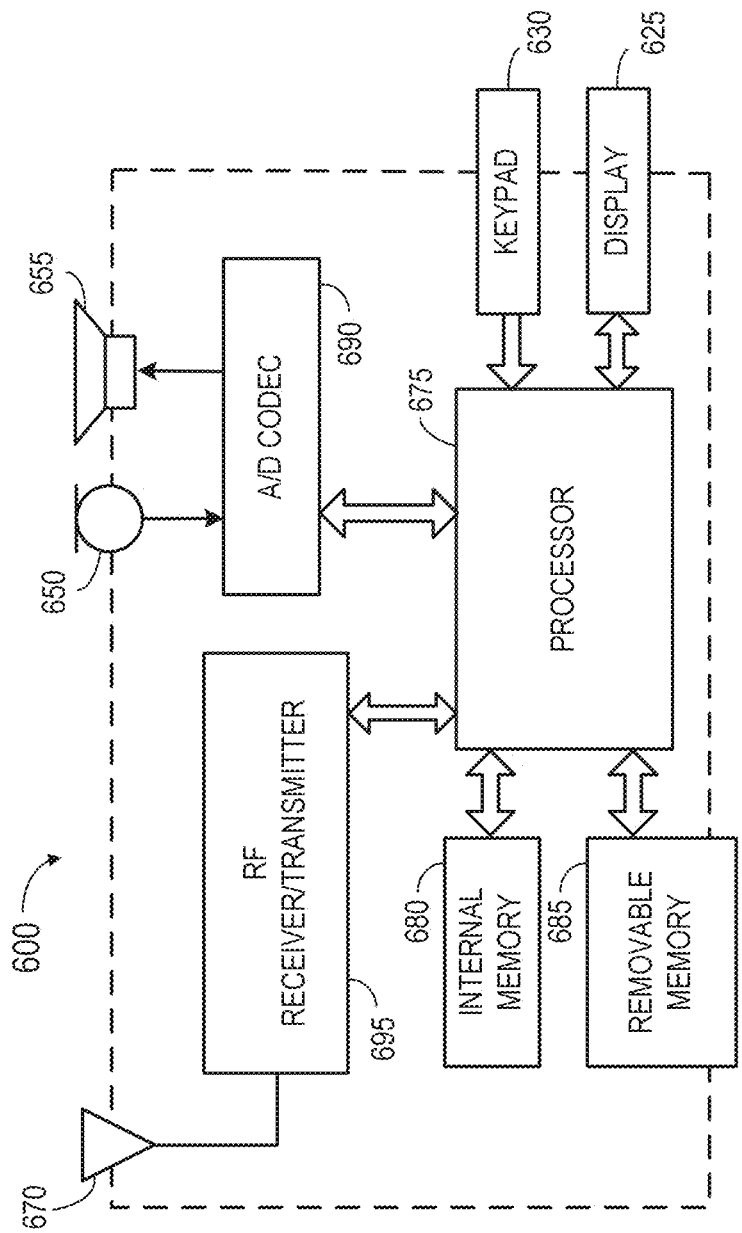
FIG. 6 is a block diagram of the internal architecture of a smartphone according to some embodiments.

FIG. 6 is a block diagram of the internal architecture of a smartphone 600 according to some embodiments. As shown, cellular telephone 600 includes processor 675, which may be a conventional microprocessor, microcontroller and/or digital signal processor (DSP) or other control circuit conventionally provided in a cellular telephone. Processor 675 is shown in communication with keypad 630 and display 625 for control thereof.

Also included in the cellular telephone 600 are internal memory 680 and removable memory 685. Internal memory 680 may include one or more of ROM (read only memory), RAM (random access memory, e.g., static RAM), and flash memory. Removable memory 685 may comprise a flash memory, a Subscriber Identity Module (SIM) card or any other removable memory that is or becomes known. Cellular telephone 600 may therefore be equipped with an interface for physically receiving and transferring data to and from removable memory 685.

Note that a communication event database might be stored in the internal memory 680 and/or the removable memory 685. Memories 680 and 685 may also store program code that is executable by processor 675 to control telephone 600. The program code may include but is not limited to operating system program code, application program code, device driver program code, and database connector program code. The program code may include code to cause cellular telephone 600 to perform functions that are described herein. In some embodiments, the program code is executable to provide a voice call transceiver, a user interface module and a text messager as described with respect to FIG. 5.

Memories 680 and 685 may also store data used in the operation of cellular telephone 600. Such data may include phone numbers, addresses, access codes, stored audio files, text corresponding to the stored audio files, and other data. Some or all of the data may be read-only, while other of the data may be rewritable.

Analog/digital coder/decoder (ND codec) 690 is also in communication with processor 675. ND codec 690 may receive analog signals from microphone 650 (including speech input from a user), convert the analog signals to digital signals, and pass the digital signals to processor 675. Conversely, processor 675 may transmit digital signals to ND codec 690, which converts the digital signals to analog signals and passes the analog signals to speaker 655. Speaker 655 then emits sound based on the analog signals (including, according to some embodiments, speech output).

RF receiver/transmitter 695 is operatively coupled to antenna 670. RF receiver/transmitter 695 may, in accordance with conventional practices, comprise a combination of two or more different receive/transmit modules (not separately shown) that operate in accordance with mutually different radio communication protocols to provide various services for the cellular telephone 600. For example, receiver/transmitter 695 may operate in accordance with one radio communication protocol to provide conventional two-way service for cellular telephone 600, and may operate in accordance with another radio communication protocol to provide PoC service for cellular telephone 600.

Those in the art will understand that the block diagram of FIG. 6 is simplified in a number of ways. For example, all power and power management components of cellular telephone 600 are omitted from the diagram. Also, some embodiments may employ an internal architecture somewhat different or completely different from that shown in FIG. 6.

Figure 7:
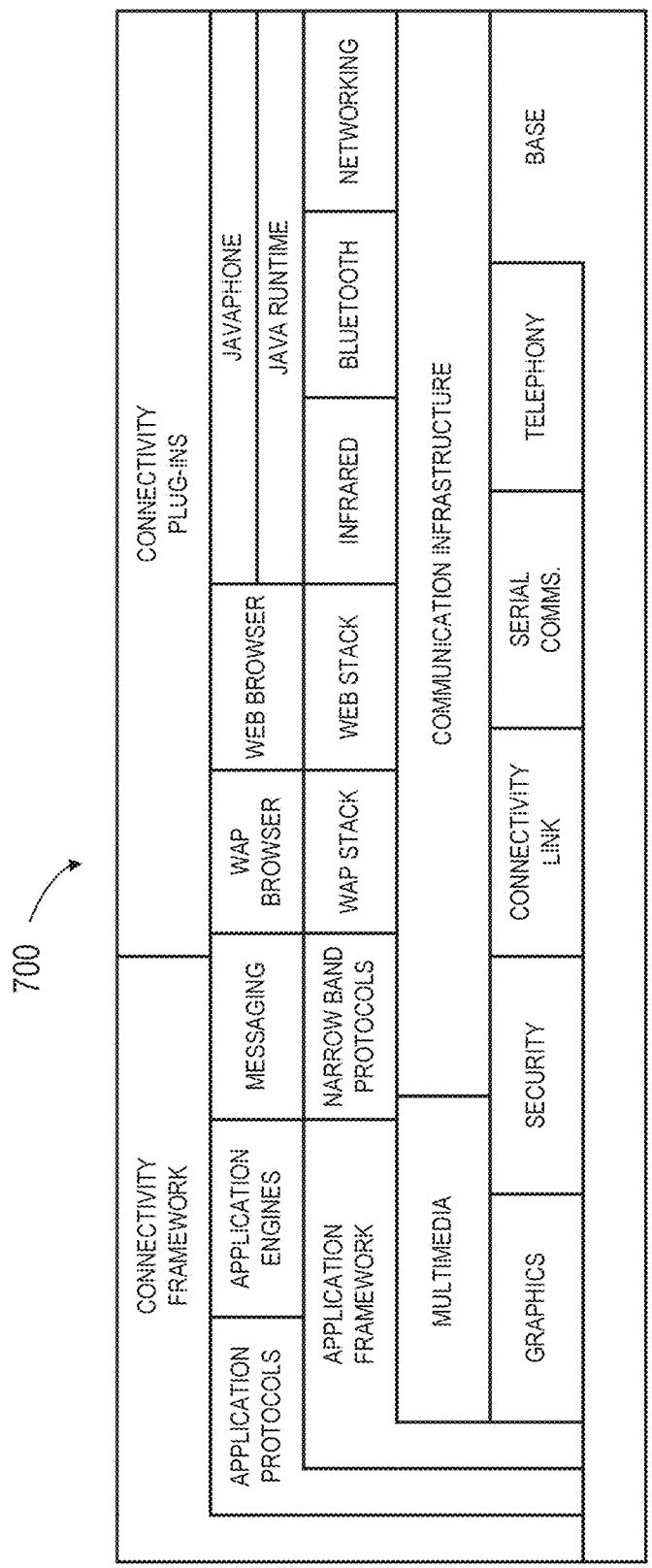
FIG. 7 is a block diagram of a smartphone operating system according to some embodiments.

FIG. 7 is a block diagram of an operating system architecture 700 that may be used in conjunction with some embodiments. Architecture 700 corresponds to the Symbian™ cellular telephone operating system but any suitable operating system may be used in conjunction with some embodiments, including those not intended and/or usable with cellular telephones. Suitable operating systems according to some embodiments include but are not limited to iOS™, Palm OS™, Windows Mobile™, RIM Blackberry™, and operating systems suitable for devices capable of transmitting text messages (e.g., PDAs and digital media players). According to some embodiments, the application engines portion of the architecture includes at least one engine to facilitate voice interactions between a user and enterprise application as appropriate.

Figure 8:
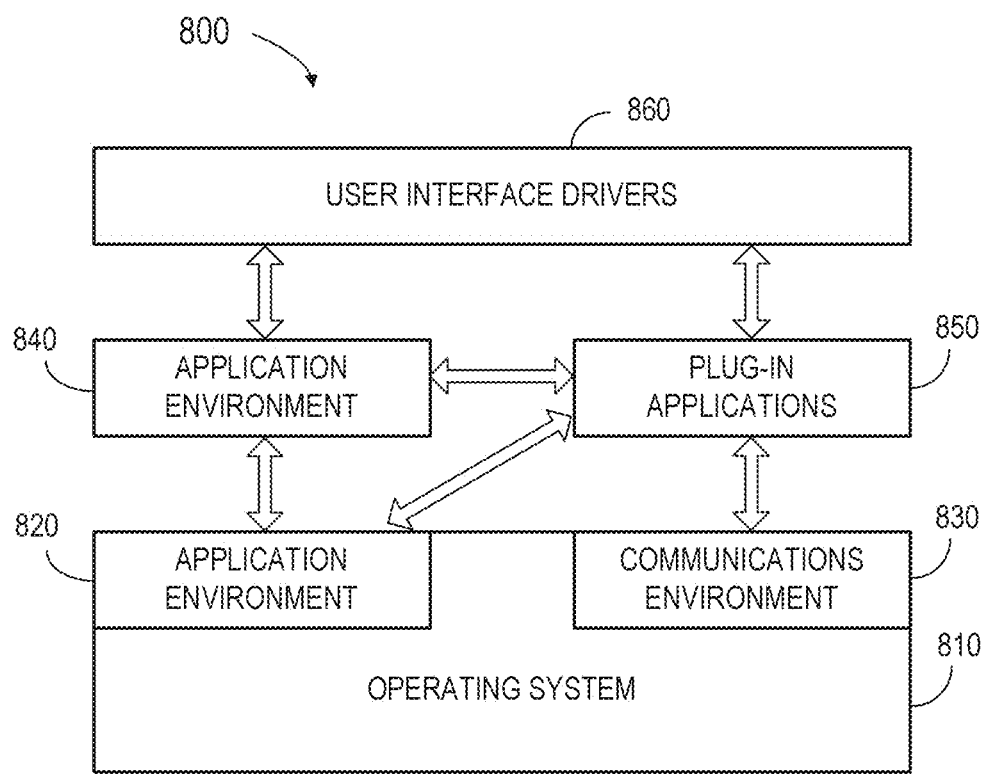
FIG. 8 is a block diagram of the software architecture of a smartphone according to some embodiments.

FIG. 8 is a block diagram of a general software architecture 800 that may be used within a smartphone in conjunction with some embodiments. Architecture 800 may operate to detect communication events initiated at or received by the telephone and facilitate voice interactions between a user and a business platform.

Architecture 800 includes operating system 810, which may comprise architecture 700 of FIG. 7. In such a case, application environment 820 and communications environment 830 may correspond, respectively, to the connectivity framework and the connectivity plug-ins of architecture 700. Generally, application environment 820 provides a platform by which another application environment 840 may interface with operating system 810. Application environment

840 may comprise a C, Java™ or any other programming environment. As such, plug-in applications 850 may be written in Java or C for execution by cellular telephone. Plug-in applications 850 may also be written for the application interface provided by application environment 820.

Communications environment 830 provides plug-in applications 850 with access to the communications functionality of operating system 810. This functionality may include text messaging, Web browsing and of course telephone communication. Plug-in applications 850 may also transmit data and commands to and receive input from user interface drivers 860 for control of the user interfaces of the smartphone.

Figure 9:
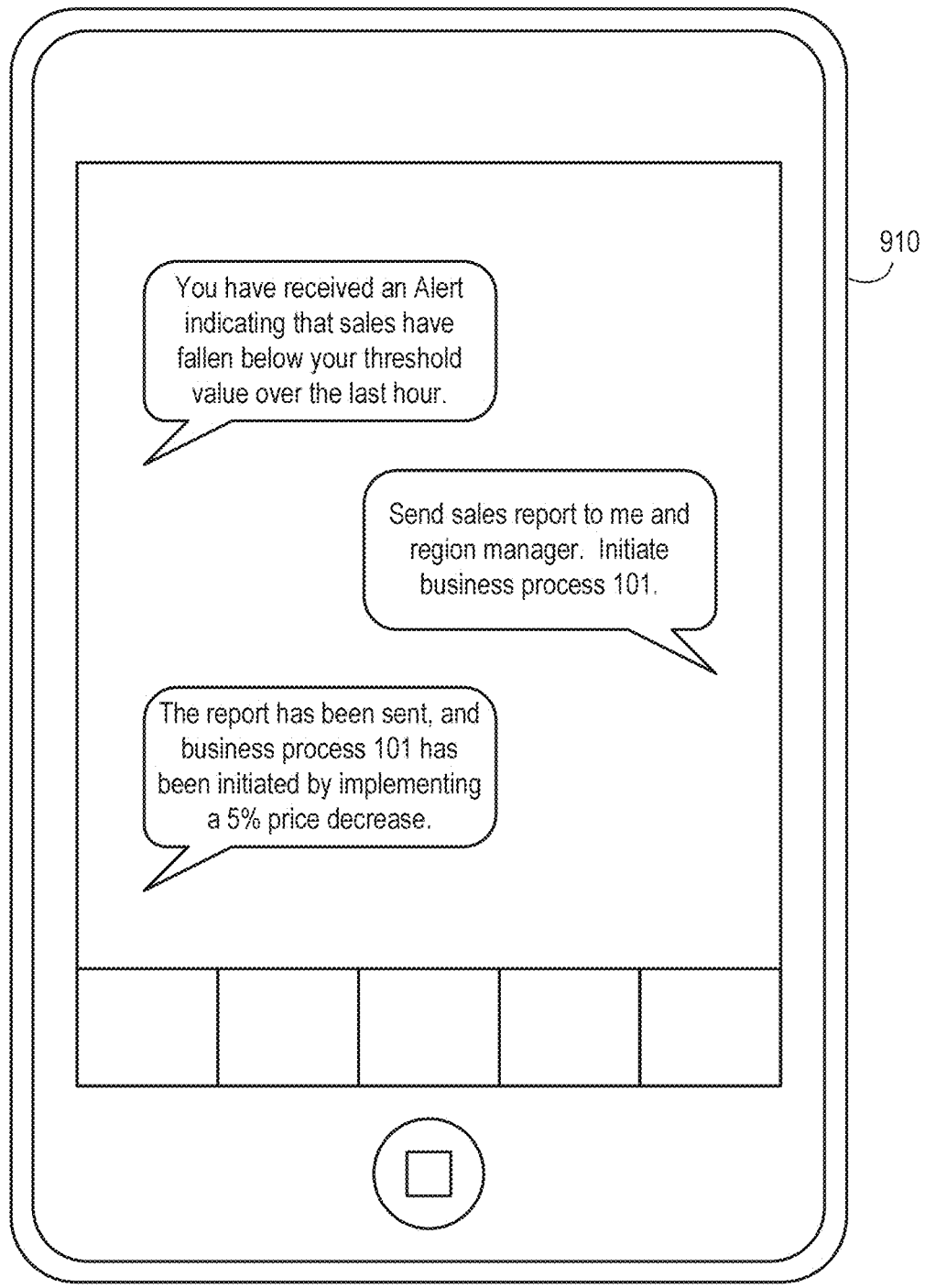
FIG. 9 is an example of a mobile user device display according to some embodiments.

According to some embodiments, an application executing in the application environment 820 transmits and/or receives information in accordance with voice interactions between a user and a remote business server. For example, FIG. 9 is an example of a mobile user device 910 display according to some embodiments. In this case, the user is informed that he or she is receiving an alert (generated by a business enterprise server) because sales have fallen below a user-defined threshold value over the last hour. The user then speaks some simple commands into a microphone of the mobile user device 910 (e.g., "send sales report" and "initiate business process"). The mobile user device 910 converts the user's speech and interacts with the remote business server to ensure that the commands are executed as appropriate.

Figure 10:
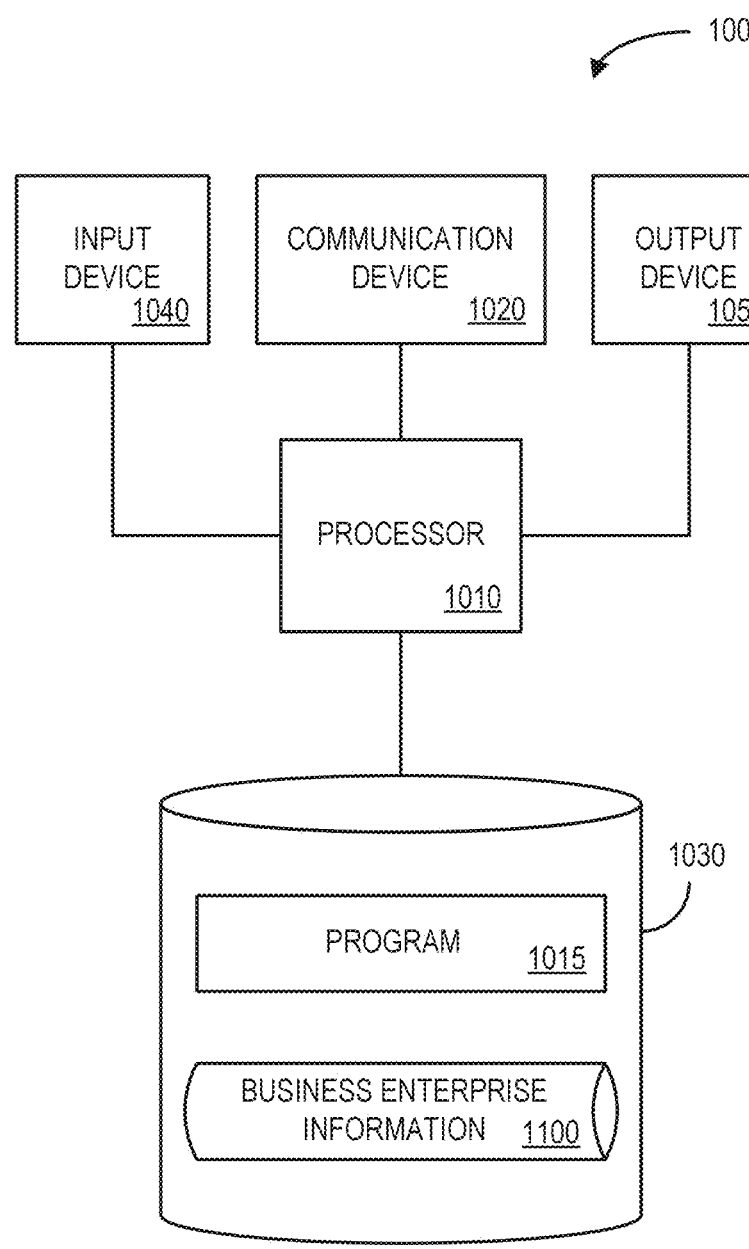
FIG. 10 is a block diagram of an apparatus according to some embodiments.

FIG. 10 is a block diagram overview of an apparatus 1000 according to some embodiments. The apparatus 1000 may be, for example, associated with a mobile user device, such as a smartphone. The apparatus 1000 comprises a processor 1010, such as one or more commercially available Central Processing Units (CPUs) in the form of one-chip microprocessors, coupled to a communication device 1020 configured to communicate via a communication network (not shown in FIG. 10). The communication device 1020 may be used, for example, as an input path to receive information about building maps and/or business process steps. The apparatus 1000 further includes an input device 1040 (e.g., a microphone to receive spoken user commands) and an output device 1050 (e.g., a speaker and screen display to interact with a user of the apparatus 1000).

The processor 1010 communicates with a storage device 1030. The storage device 1030 may comprise any appropriate information storage device, including combinations of magnetic storage devices (e.g., a hard disk drive), optical storage devices, and/or semiconductor memory devices. The storage device 1030 stores a program 1015 for controlling the processor 1010. The processor 1010 performs instructions of the program 1015 and thereby operates in accordance with any of the embodiments described herein. For example, the processor 1010 may receive business enterprise information from a remote enterprise server. The processor 1010 may then automatically convert at least some of the business enterprise information into speech output provided to a user of the user device. Speech input from the user may be received and converted by processor 1010. The processor 1010 may then interact with the remote enterprise server in accordance with the converted speech input and the business enterprise information.

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the apparatus 1000 from another device; or (ii) a software application or module within the apparatus 1000 from another software application, module, or any other source.

In some embodiments (such as shown in FIG. 10), the storage device 1030 further stores a business enterprise information database 1100 (e.g., including information about interactions between a user and an enterprise server). An example of a database that may be used in connection with the apparatus 1000 will now be described in detail with respect to FIG. 11. Note that the database described herein is only an example, and additional and/or different information may be stored therein. Moreover, various databases might be split or combined in accordance with any of the embodiments described herein.

Referring to FIG. 11, a table is shown that represents the business enterprise information database 1100 that may be stored at the apparatus 1000 according to some embodiments. The table may include, for example, entries identifying information about a building and locations within the building. The table may also define fields 1102, 1104, 1106, 1108, 1110 for each of the entries. The fields 1102, 1104, 1106, 1108, 1110 may, according to some embodiments, specify: an enterprise information identifier 1102, enterprise information 1104, user voice input 1106, converted text 1108, and a result 1110. The information in the map database 1100 may be created and updated, for example, based on interactions between a user and a remote business application.

The enterprise information identifier 1102 may be, for example, a unique alphanumeric code identifying an interaction between a mobile device, remote business server, and/or user. The enterprise information 1104 might indicate, for example, a type of action or workflow step associated with the interaction. The user voice input 1106 might comprise, for example, an audio file and converted text 1108 may contain the contents of the user's spoken command. The result 1110 might indicate what was done in response to the spoken command found in the user voice input 1106.

Figure 12:
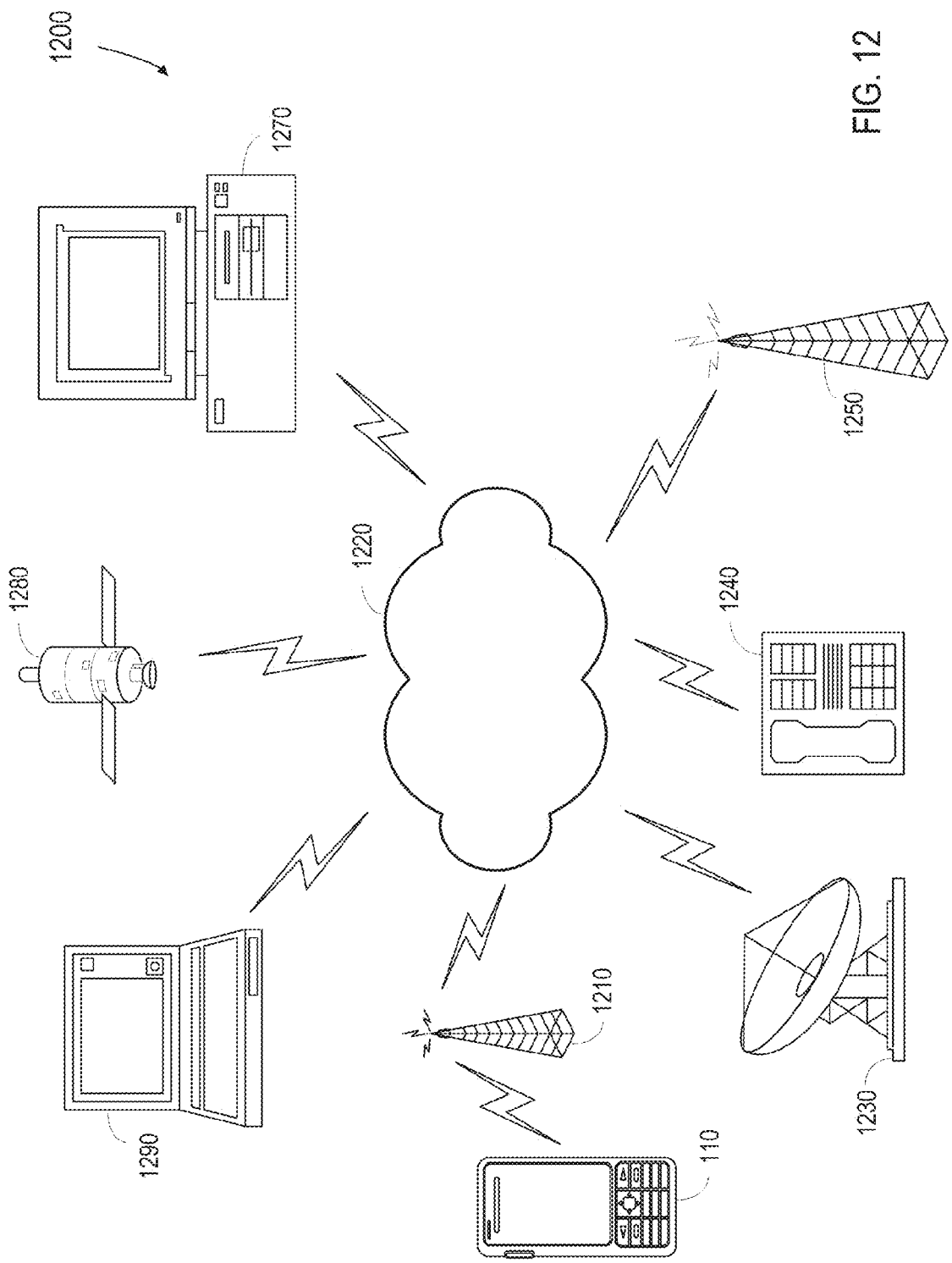
FIG. 12 is a diagram of a system architecture according to some embodiments.

FIG. 12 is a partial diagram of a communication architecture 1200 according to some embodiments. In particular, a mobile communication device 110 (in this example, a smartphone) is shown in communication with tower 1210, which may forward the transmission to communication network 1220 according to governing protocols. Communication network 1220 may include any number of devices and systems for transferring data, including but not limited to local area networks, wide area networks, telephone networks, cellular networks, fiber-optic networks, satellite networks, infra-red networks, radio frequency networks, and any other type of networks which may be used to transmit information between devices. Additionally, data may be transmitted through communication network 1220 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Devices 1230 through 1290 are examples of some devices that may be a part of or in communication with communication network 1220. As such, devices 1230 through 1290 may receive communication events, either as intended recipients or as network nodes for passing messages. Devices 1230 through 1290 include satellite transmitter/receiver 1230, landline telephone 1240 having a subscriber line interface circuit to receive a telephone line (e.g., a cordless phone or a corded phone), communication tower 1250, desktop computer or server 1270, satellite 1280 and portable computing device 1290. Note the server 1270 might be associated with, for example, a remote database containing CRM information (e.g., to be interacted with via spoken commends through the mobile communication device 110). Any other suitable devices may be used as a transmitting device or a receiving device in conjunction with some embodiments.

The elements of system 1200 may be connected differently than as shown. For example, some or all of the elements may be connected directly to one another. Embodiments may include elements that are different from those shown. Moreover, although the illustrated communication links between the elements of system 1200 appear dedicated, each of the links may be shared by other elements. Elements shown and described as coupled or in communication with each other need not be constantly exchanging data. Rather, communication may be established when necessary and severed at other times or always available but rarely used to transmit data. According to some embodiments, voice interactions between a user and a business application executing at the server 1270 are facilitated via an interactive business voice dialog platform executing on demand in a computing cloud environment (located with or accessed via the communication network 1220).

Figure 13:
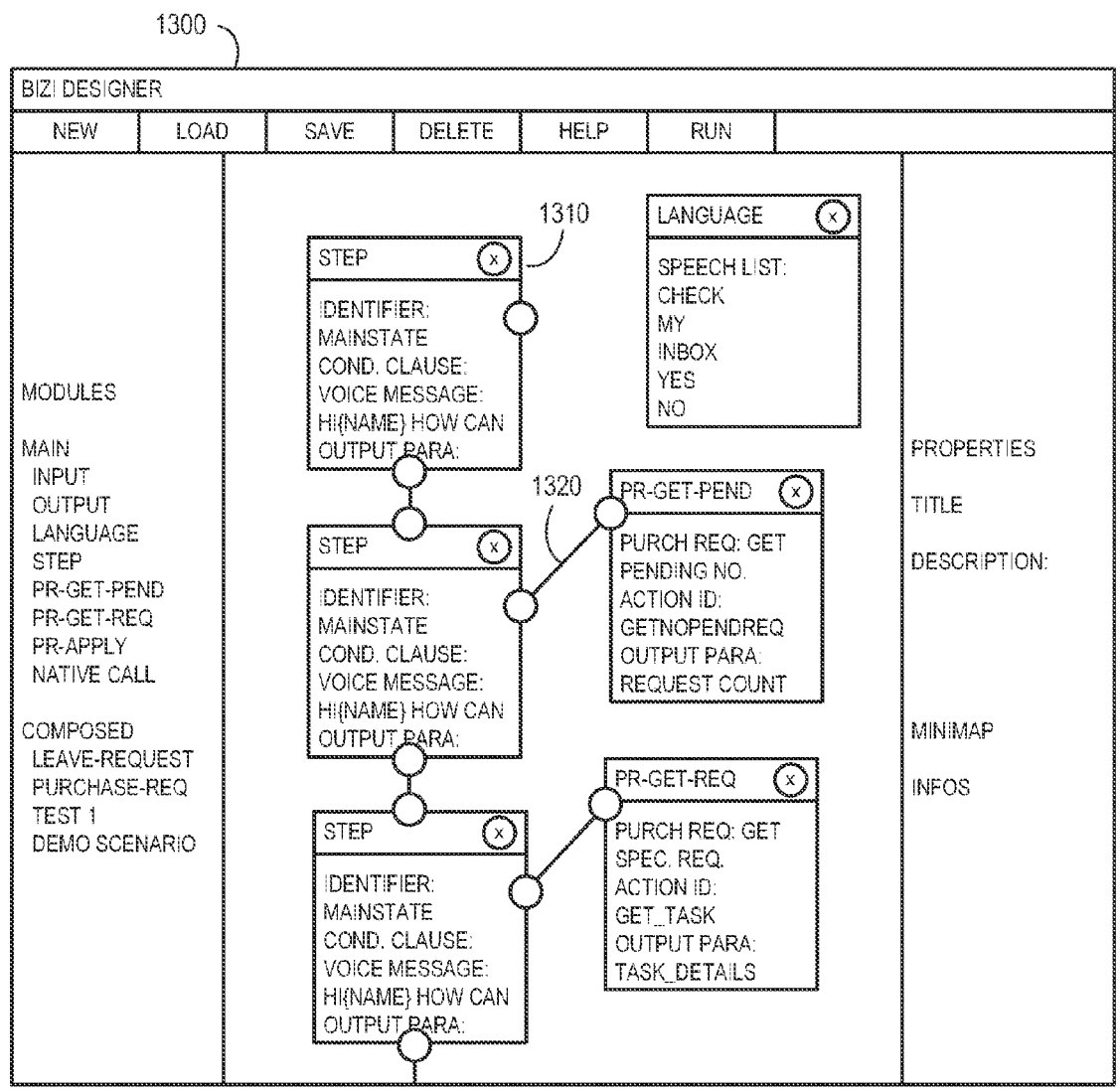
FIG. 13 is an example of a design tool graphical user interface that may be used to create a new model according to some embodiments.

The system 1200 may use one or more models to facilitate voice interactions associated with business information via handheld devices. Such models may be created, for example, by a model designer or architect via a platform that creates and extends applications for enterprise voice interaction scenarios. Designers may be able to define a model (represented in a specified XML schema) that represents the voice interaction between a set of enterprise services and end-user voice commands. The platform may be pluggable and provide an ability to add new models which will describe new business interactions without any coding. For example, FIG. 13 is an example of a design tool Graphical User Interface ("GUI") 1300 that might be used to create new models according to some embodiments. In particular, the designer might add and/or arrange elements 1310 to the model, such as elements 1310 associated with interactive steps, conditions, voice messages, output parameters, business information interfaces, etc. The design tool GUI 1300 might also let a designer graphically couple 1320 the elements 1310 as appropriate to define a new business interaction model.

Once a designer is finished modeling via the GUI 1300, an XML file may be generated which can be deployed to a voice interaction server. According to some embodiments, this may automatically add the modeled business scenario to any device that communicates with the voice interaction server. Note that the information defined via the design tool GUI 1300 may be automatically converted into XML statements as appropriate. For example, the following is an example of XML statements that might be associated with business information voice interactions in accordance with some embodiments:

```xml
<?xml version="1.0" encoding="utf-8"?>
<BusinessInteraction Id="WorkflowApproval"
BaseUrl="http://myserver:8000/Services/PurchaseRequestApproval">
    <BusinessModel Id="PurchaseRequestTask">
        <Property Name="workitem_Id" Type="String"/>
        <Property Name="status" Type="String"/>
        <Property Name="subject" Type="String"/>
        <Property Name="type" Type="String"/>
        <Property Name="priority" Type="String"/>
        <Property Name="task_name" Type="String" />
        <Property Name="actual_owner" Type="String" />
        <Property Name="start_dl" Type="DateTime" />
        <Property Name="end_dl" Type="DateTime" />
        <Property Name="description" Type="String" />
        <Property Name="comments" Type="String" />
        <Property Name="requester_name" Type="String" />
        <Property Name="decision_options" Type="Collection(String)" />
        <BussinessAction Name="GetNumberOfPendingPurchaseRequests"
Return Type="Number" Href="GetNumberOfPendingPurchaseRequests" />
        <BussinessAction Name="GetSpecificTask"
ReturnType="PurchaseRequestTask" Href="GetSpecificTask">
            <Parameter Name="workitem_index" Type="Number"/>
        </BusinessAction>
        <BusinessAction Name="ApplyDecision" ReturnType="String"
Href="ApplyDecision">
            <Parameter Name="decision" Type="String" />
        </BussinessAction>
    </BusinessModel>
    <Language>en-us</Language>
    <GrammerFile>PurchaseRequestApprovalGrammer.grammer</GrammerFile>
    <BusinessDialog>
        <InitialState Id="MainState">
            <Output>
                <Message SayOnce="True">Hi {PersonName}, how can I help you?</Message>
            </Output>
            <Target StateId="GetPendingPurchaseRequests"></Target>
        </InitialState>
        <State Id="CheckInbox">
            <If Condition="{Hypothesis} contains 'check inbox'">
                <Output>
                    <TriggerAction Id="GetNumberOfPendingPurchaseRequests"
BusinessAction="PurchaseRequestApproval.PurchaseRequestTask.GetNumber
OfPendingPurchaseRequests"></TriggerAction>
```

-continued

```
        <Message>You have
{TriggerActionResult:GetNumberOfPendingPurchaseRequests} pending
purchase request. Shall I read it?</Message>
                </Output>
                <Target StateId="ReadPurchaseRequest"></Target>
            </If>
        </State>
        <State Id="ReadPurchaseRequest">
            <If Condition="{Hypothesis} contains 'yes'">
                <Output>
                    <TriggerAction Id="GetSpecificTask"
BusinessAction="PurchaseRequestApproval.PurchaseRequestTask.GetSpecificT
ask"></TriggerAction>
                    <Message>From
{TriggerActionResult:GetSpecificTask.requester_name}\n
{TriggerActionResult:GetSpecificTask.subject}\n
{TriggerActionResult:GetSpecificTask.description}.\n Would you like to
{TriggerActionResult:GetSpecificTask.decision_options}?</Message>
                </Output>
                <Target StateId="TakeDecision">
                    <Parameter
Id="DecisionOptions">{TriggerActionResult:GetSpecificTask.decision_options}</
Parameter>
                </Target>
            </If>
            <ElseIf Condition="{Hypothesis} contains 'no'">
                <TargetStateId="MainState"></Target>
            </ElseIf>
        </State>
        <State Id="TakeDecision">
            <If Condition="{Hypothesis} contains {Parameter:DecisionOptions}">
                <Output>
                    <Message>Sending Decision...</Message>
                </Output>
                <Target StateId="ApplyDecision">
                    <Parameter Id="Decision">{Hypothesis}</Parameter>
                </Target>
            </If>
        </State>
        <State Id="ApplyDecision">
            <Output>
                <TriggerAction Id="ApplyDecision"
BusinessAction="PurchaseRequestApproval.PurchaseRequestTask.ApplyDecisio
n">
                    <Parameter Id="decision">{Parameter:Decision}</Parameter>
                </TriggerAction>
                <Message>Decision Sent.</Message>
            </Output>
            <Target StateId="MainState">
            </Target>
        </State>
        <VoiceRecognitionErrorMessage>Could not understand. Please say
again.</VoiceRecognitionErrorMessage>
    </BusinessDialog>
</BusinessInteraction>
```

According to some embodiments, a backend business system may include various processes and workflows and may further serve as a compliance and policy adherence "agent." For example, by virtue of translating workflows into interactive voice instructions, a backend system may promote an alignment of a user working within a set of business rules or goals. For example a CRM process might make sure that steps taken by a user are appropriate, and navigate the user (e.g., via a text-to-speech tool) to the next step in the workflow process. Thus, an interactive enterprise business voice platform may bring forward to a user the backend workflows and help navigate the user through various workflow step making sure he or she adheres to the enterprise rules and transaction policies. According to some embodiments, the platform may further monitor a user's spoken words in connection with a "speech adherence" policy (e.g., to ensure that a person is using proper terminology).

Thus, some embodiments may establish methods and mechanisms to efficiently, accurately, and/or automatically facilitate voice interactions between a user and a remote enterprise server. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to business systems and databases, note that embodiments may be associated with other types of enterprise data. For example, voice interactions with financial, governmental, educational, and/or medical processes and systems may be facilitated in accordance with any of the embodiments described herein.

Moreover, while embodiments have been illustrated using particular types of tables and databases, embodiments may be implemented in any other of a number of different ways. For example, some embodiments might be associated with third-party and/or publically available information, such as flight or train schedules, stock prices, etc. available via web sites. Further, while examples have been provided in a single language, note that any embodiment may be associated with language translation tools (e.g., to convert Spanish to English). Still further, embodiments may support operation by users who are vision impaired and, in some cases, voice interactions might be facilitated from a user, to a user, or both from and to a user.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
   receiving, at user device, business enterprise information from a remote enterprise server;
   receiving, at the user device, an extensible markup language ("XML") schema from a voice interaction server, the XML schema representing a voice interaction between an enterprise service and end-user voice commands which are associated with a modeled business scenario;
   automatically converting, by the user device, at least some of the business enterprise information, based on the XML schema, into speech output provided to a user of the user device, the speech output navigating the user through a workflow associated with the modeled business scenario;
   receiving speech input from the user via the user device;
   automatically converting the speech input; and
   interacting with the remote enterprise server in accordance with the converted speech input and the business enterprise information.

2. The method of claim 1, wherein the user device is associated with at least one of: (i) a mobile computer, (ii) a smartphone, (iii) a gaming device, (iv) a navigation device, (v) a music player, or (vi) glasses.

3. The method of claim 1, wherein the user device comprises at least one of: (i) a personal computer, or (ii) a kiosk.

4. The method of claim 1, wherein the conversion of the business enterprise information into the speech output is facilitated by an interaction engine, executing at the user device, via a text-to-speech connector communicating with a third party text-to-speech engine.

5. The method of claim 1, wherein the conversion of speech input is facilitated by an interaction engine, executing at the user device, via a speech-to-text connector communicating with a third party speech-to-text engine.

6. The method of claim 1, wherein the remote enterprise server is associated with at least one of: (i) an Enterprise Resource Planning application, (ii) a Customer Relationship Management application, or (ii) an Advanced Business Application Programming application.

7. The method of claim 1, wherein said converting is performed in accordance with model extensible markup language information.

8. The method of claim 1, wherein said converting is performed in accordance with an application programming interface.

9. The method of claim 1, wherein said interaction is associated with at least one of: (i) a purchase request, (ii) a purchase order, (iii) a sales order, (iv) contact information, (v) a workflow, or (vi) an alert.

10. The method of claim 1, wherein said interaction is performed via an interactive business voice dialog platform executing on demand in a computing cloud environment.

11. A non-transitory, computer-readable medium storing program code executable by a computer processor to perform a method, the method comprising:
    receiving, at user device, business enterprise information from a remote enterprise server;
    receiving, at the user device, an extensible markup language ("XML") schema from a voice interaction server, the XML schema representing a voice interaction between an enterprise service and end-user voice commands which are associated with a modeled business scenario;
    automatically converting, by the user device, at least some of the business enterprise information, based on the XML schema, into speech output provided to a user of the user device, the speech output navigating the user through a workflow associated with the modeled business scenario;
    receiving speech input from the user via the user device;
    automatically converting the speech input; and
    interacting with the remote enterprise server in accordance with the converted speech input and the business enterprise information.

12. The medium of claim 11, wherein the user device is associated with at least one of: (i) a mobile computer, (ii) a smartphone, (iii) a gaming device, (iv) a navigation device, (v) a music player, or (vi) glasses.

13. The medium of claim 11, wherein the user device comprises at least one of: (i) a personal computer, or (ii) a kiosk.

14. The medium of claim 11, wherein the conversion of the business enterprise information into the speech output is facilitated by an interaction engine, executing at the user device, via a text-to-speech connector communicating with a third party text-to-speech engine.

15. The medium of claim 11, wherein the conversion of speech input is facilitated by an interaction engine, executing at the user device, via a speech-to-text connector communicating with a third party speech-to-text engine.

16. The medium of claim 11, wherein the remote enterprise server is associated with at least one of: (i) an Enterprise Resource Planning application, (ii) a Customer Relationship Management application, or (ii) an Advanced Business Application Programming application.

17. A mobile user device associated with a user, comprising:
    a communication port to receive (i) business enterprise information from a remote enterprise server and (ii) an extensible markup language ("XML") schema from a voice interaction server, the XML schema representing a voice interaction between an enterprise service and end-user voice commands which are associated with a modeled business scenario; and
    a processor coupled to the communication port and configured to: (i) convert at least some of the business enterprise information into speech output provided to a user of the user device, (ii) receive speech input from the user, (iii) convert the speech input based on the XML schema, into speech output provided to a user, the speech output navigating the user through a workflow associated with the modeled business scenario, and interact with the remote enterprise server via the communication port in accordance with the converted speech input and the business enterprise information.

18. The device of claim 17, wherein the conversion of the business enterprise information into the speech output is facilitated by an interaction engine, executing at the user device, via a text-to-speech connector communicating with a third party text-to-speech engine.

19. The device of claim 17, wherein the conversion of speech input is facilitated by an interaction engine, executing at the user device, via a speech-to-text connector communicating with a third party speech-to-text engine.

20. The device of claim 17, wherein the remote enterprise server is associated with at least one of: (i) an Enterprise Resource Planning application, (ii) a Customer Relationship Management application, or (ii) an Advanced Business Application Programming application.

* * * * *